Sept. 27, 1932.    L. T. ROBINSON    1,880,106

FILM DRIVE

Filed Oct. 4, 1927

Inventor
Lewis T. Robinson,
by Alexander S. ———
His Attorney.

Patented Sept. 27, 1932

1,880,106

UNITED STATES PATENT OFFICE

LEWIS T. ROBINSON, OF SCHENECTADY, NEW YORK, ASSIGNOR TO GENERAL ELECTRIC COMPANY, A CORPORATION OF NEW YORK

FILM DRIVE

Application filed October 4, 1927. Serial No. 224,017.

My invention relates to apparatus for recording sound on a moving film or for reproducing the sound from a previously made film record and it also relates to such apparatus together with motion picture recording or reproducing apparatus. My invention relates particularly to the driving means for such apparatus.

In motion picture apparatus as commonly constructed the film is given an intermittent movement at one point between the winding and unwinding reels and various forms of apparatus are used to produce this intermittent movement. In apparatus for recording sound on a film or for reproducing it therefrom the film must move uniformly and for good results the movement should be free from vibrations. Where the two apparatus are arranged close together so that the same film passes through them serially and the driving connection to the sound apparatus is taken from the picture apparatus, it has been found that vibrations arising from the mechanism producing the intermittent motion in the picture apparatus are transmitted through the driving connection to the film in the sound apparatus. It is one object of my invention to provide an improved drive for picture and sound apparatus in which the objectionable effect of the picture apparatus on the uniform movement of the film in the sound apparatus shall be greatly reduced if not eliminated. Another object of my invention is the provision of an improved drive for the sound apparatus wherein small variations in the speed of the film incident to irregularities in the film or to the operation of the mechanism for supporting or moving the film in the apparatus are also reduced or eliminated. Other objects of my invention will appear as the detailed description progresses.

My invention will be better understood from the following description taken in connection with the accompanying drawing, and its scope will be pointed out in the appended claims.

Figure 1:
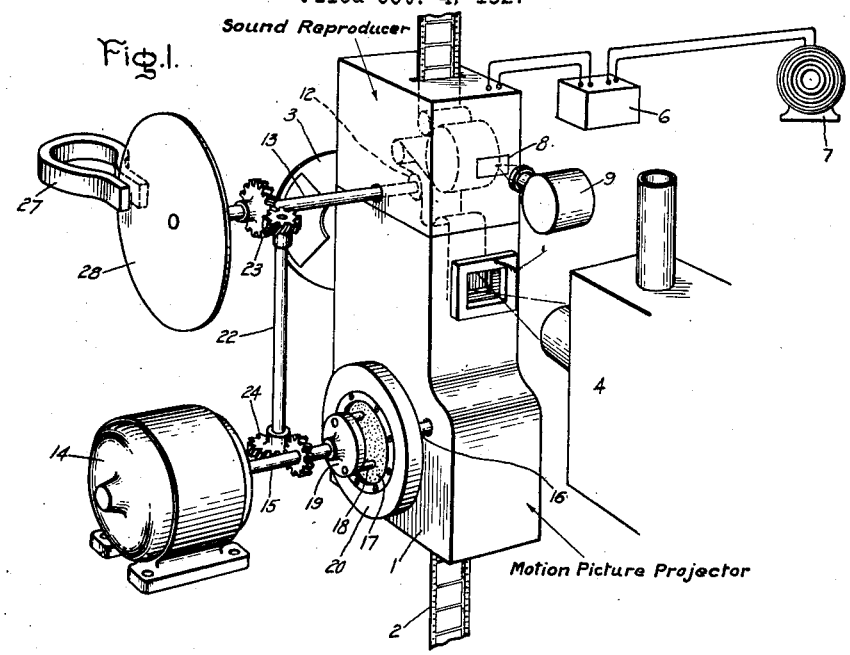
Figure 2:
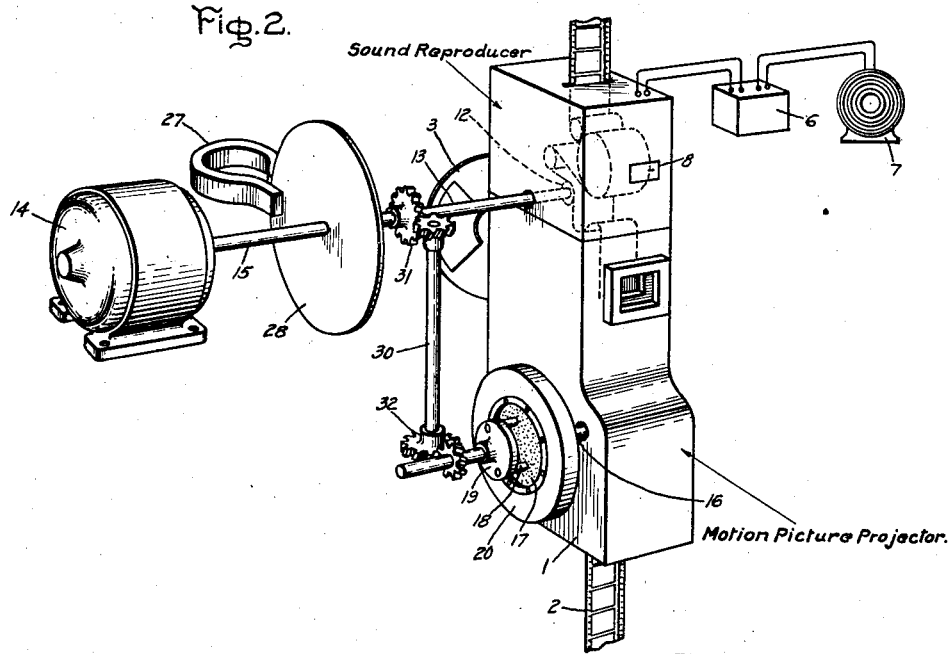

Referring to the drawing, Fig. 1 shows a motion picture projector and a sound reproducer having a drive constructed in accordance with my invention and Fig. 2 shows a modification thereof.

For illustrative purposes I have chosen to show my invention as applied to apparatus for projecting motion pictures and for reproducing sound incident thereto from a film bearing both picture and sound records, the film passing serially through the respective apparatus. The picture projector 1 may be of any well-known type having mechanism therein for giving the film 2 therein the usual intermittent movement. The projector is shown as having the shutter 3 and the lantern 4 containing the source of light. Above the projector is the sound reproducer 5 connected with which is the amplifier 6 and the loud speaker 7. The sound reproducer 5 is shown of the form in which the film passes over a drum close to a plate having a narrow light aperture shown at 8 through which light from the lantern 9 passes to the sound record on the film and thence to a suitable photo-electric cell, not shown. The resulting electric impulses are amplified by a suitable amplifier 6 and converted into sound waves by the loud speaker 7.

The film is drawn through the sound reproducer with a uniform movement by suitable mechanism comprising for example the sprocket wheel 12 on the shaft 13. The electric motor 14, which may be any constant speed motor, preferably a three phase motor, is connected to drive both the picture projector and the sound reproducer. In Fig. 1, I have shown the motor shaft 15 direct-connected with the projector drive shaft 16 through a yielding or vibration absorbing coupling. This coupling is illustrated as comprising the disk 17 which for example may be of leather having two holes which receive the two pins 18 on disk 19 carried by the motor shaft. To further reduce vibrations arising in the projector I have shown on the drive shaft 16 the fly wheel 20 to which for convenience the disk 17 is attached. Motor shaft 15 and drive shaft 13 are interconnected by the counter shaft 22 and the gears 23 and 24, preferably spiral gears, providing the necessary speed reduction which in the case of the projector is provided for by suitable gearing, not shown, within the projector casing. By arranging a separate driving connection from the motor to the sound reproducer and to the picture projector and by interposing a vibration absorbing means in the connection with the projector, vibrations arising in the projector mechanism will be transmitted to the drive shaft of the sound reproducer only to a negligible extent, if at all.

In addition to the above noted effect of the projector on the uniformity of the film movement in the sound reproducer there are other factors which disturb the uniform movement of the film such for example as those resulting from irregularities in the film and the operation of the winding and unwinding reels which it will be understood connect with the apparatus illustrated but which for simplicity have been omitted from the drawing. For the best results in recording and reproducing sound it is essential that the film be moved past the light beam with a speed which is uniform to a high degree of exactness. Particularly is this true when music is being recorded or reproduced as extremely slight variations in the speed of the film especially when they recur at regular intervals are noticeable to a trained musical ear. I greatly reduce or entirely eliminate much of these variations in film speed by the provision of a loading device whose effect is to add an additional constant load to the motor. Various well-known means may be employed for this load but I prefer to use a magnetic drag comprising a fixed magnet and a conducting member rotatable in the field thereof. In Fig. 1 of the drawing I have shown the permanent magnet 27 between and close to the poles of which rotates the metal disk 28 mounted on the shaft 13. This form of loading device is particularly well adapted for the purpose described inasmuch as it is not subject to variations in its braking effect such as occur for example in a friction brake and its braking effect always bears a definite relation to the speed. Where an additional steady load is used, such as that just described, the load variations of the film driving mechanism comprise a relatively smaller proportion of the total load driven by the motor than where such is not used. In arrangements such as that shown by Fig. 1 where gearing is used to transmit motion to the film sprocket a further advantage of the loading device is that it takes up all back lash of the gears.

In the modification illustrated by Fig. 2 the motor shaft 15 is direct connected or is continuous with the shaft 13, all gearing between the motor and the film driving member in the sound reproducer being thereby eliminated. In this case I use a slow speed motor, however, if preferred, a higher speed motor may be used together with suitable gearing for reducing the driving speeds of the two apparatus. In the modified form the projector is shown driven from the motor shaft through the counter shaft 30 and spiral gearing 31 and 32. The projector drive shaft 16 is provided with the same vibration absorbing device and flywheel as that shown in the form illustrated by Fig. 1.

For convenience in illustrating my invention I have shown the second reproducer and the picture projector arranged one above the other with the driving motor and connections thereto including the vibration absorbing member and loading means arranged outside of the reproducer and projector casings. However, I prefer a more compact arrangement wherein the sound reproducer and picture projector comprise a single or unitary structure with the drive connections, vibration absorber loading means, etc. incorporated in the structure.

I have chosen the particular embodiments described above as illustrative of my invention and it will be apparent that various modifications may be made without departing from the spirit and scope of my invention which modifications I aim to cover by the appended claims.

What I claim as new and desire to secure by Letters Patent of the United States, is:—

1. In combination, a sound reproducer and a motion picture projector through which a film having sound and picture records thereon is adapted to be passed in series, mechanism in the sound reproducer for moving the film uniformly, mechanism in the projector for moving the film intermittently, a single driving motor connected with both of said mechanisms and means for preventing vibrations incident to the intermittent film moving mechanism from being transmitted through said drive connections to the uniform film moving mechanism comprising a yielding member interposed in the connection with the projector and a flywheel between said yielding member and the projector.

2. In combination, a sound reproducer mechanism including means for moving a film uniformly, a motion picture projector mechanism having means for moving the film intermittently, a single driving motor connected with both of said mechanisms and means for preventing vibrations incident to the intermittent film moving mechanism from being transmitted through said drive connections to the uniform film moving mechanism comprising a yielding member interposed in the connection with the projector and a flywheel between said yielding member and the projector.

3. In a machine of the character described, the combination of a photographic sound apparatus casing having a film progressing mechanism and a main drive shaft, a motion picture projecting apparatus casing having a film progressing mechanism, one of said casings being mounted upon and carried by the other casing, a driven shaft operably connected to the latter film progressing mechanism, means for operably connecting the drive shaft to the driven shaft so that both film progressing mechanisms are operated in time relation, and a yielding member interposed in the connection with the projecting apparatus preventing vibrations incident to the film progressing mechanism of the projecting apparatus from being transmitted through the drive connection to the film progressing mechanism of the sound apparatus.

In witness whereof, I have hereunto set my hand this 3d day of October, 1927.

LEWIS T. ROBINSON.